United States Patent [19]

Hines et al.

[11] 4,123,759

[45] Oct. 31, 1978

[54] PHASED ARRAY ANTENNA

[75] Inventors: Marion E. Hines, Weston; Harold E. Stinehelfer, Sr., Burlington; Dana W. Atchley, Jr., Lincoln, all of Mass.

[73] Assignee: Microwave Associates, Inc., Burlington, Mass.

[21] Appl. No.: 779,701

[22] Filed: Mar. 21, 1977

[51] Int. Cl.[2] .......................... H01Q 3/26; G01S 5/04; H01Q 19/10; H01Q 3/24

[52] U.S. Cl. .................................... 343/854; 343/120; 343/876; 343/832

[58] Field of Search ................ 343/120, 832, 854, 876

[56] References Cited

U.S. PATENT DOCUMENTS

| | | | |
|---|---|---|---|
| 2,607,008 | 8/1952 | Guarino et al. | 343/854 |
| 3,056,961 | 10/1962 | Mitchell | 343/854 |
| 3,922,685 | 11/1975 | Opas | 343/876 |
| 3,996,592 | 12/1976 | Kline et al. | 343/876 |

*Primary Examiner*—Alfred E. Smith
*Assistant Examiner*—Harry E. Barlow
*Attorney, Agent, or Firm*—Alfred H. Rosen

[57] ABSTRACT

An antenna system for producing from a fixed array of active antenna elements which are each omnidirectional in a plane, a sensitivity pattern that is directional in said plane and which pattern can be rotated around the array. The system consists of at least three antenna elements located at the corners of a regular polygon and are excited with substantially equal magnitudes of current that are in the same phase at two adjacent corners and different in phase by substantially 90 electrical degrees at the third corner. The antenna system further includes an electrical power dividing and phasing network as well as electrical switching means to effect proper rotation.

22 Claims, 9 Drawing Figures

PHASED ARRAY ANTENNA

BACKGROUND AND SUMMARY OF THE INVENTION

This invention relates to multi-element antenna arrays for the transmission and reception of radio waves having a directional characteristic. In particular, it relates to those arrays whose direction of maximum transmission or reception can be altered or "steered" by electrical switching means, and which are commonly known as "phased arrays".

It is well known that an antenna array consisting of a number of separate radiating antenna elements which are simultaneously driven from a common source of radio frequency power, through an electrical power dividing and an electrical phasing network, can be so arranged in spaced and the individual phases so determined, that the radiated energy will be highly concentrated in one direction and strongly suppressed for other directions.

Such a combination of multiple antennas is known as a "phased array". Because of the particular arrangement of the individual antennas in space, combined with a particular set of electrical phases at each element, the individually radiated waves combine and add together in phase in the preferred direction. In other non-preferred directions, the vector sum of the radiated waves from all of the antenna elements will be very much weaker and in some cases may completely vanish.

It is also well known that an array of antennas, fixed in position, can have its preferred radition direction altered or "steered" by changing the relative electrical phases of the radio-frequency (RF) energy supplied to each element. To accomplish this, RF switches are usually employed which change the phase relationships among the multiple elements. When this is done, the complete array and its associated power dividing, switching and phasing networks constitute a "steerable phased array". Such arrays have been used for RADAR antennas at UHF and microwave frequencies and for communications at radio, HF, VHF, and UHF frequencies.

It is also well known that any radio antenna, or any interconnected array of antennas, has identical directional characteristics when acting either as a transmitter or as a receiver of radio waves, to or from distant points. In this disclosure, we will be discussing transmitter radiation characteristics in most cases, but it is to be understood that the directional characteristics apply equally well to an application as a receiver.

This invention is a new form of steerable phased-array antenna which, in one embodiment, uses four vertical antenna elements above the plane of the earth, equally spaced on a circle parallel to the earth, arranged to radiate outward parallel to the earth's surface. When combined with power-dividing, switching, and phasing networks which are here disclosed, it is possible to maximize the radiation in any one of four primary directions without moving the antenna. The angular width of the radiation pattern is sufficiently wide that the four possible patterns overlap, allowing transmission or reception in any horizontal direction, over 360° of azimuth angle around the horizon.

Application of such an antenna is advantageous for radio communications to and from a station which must communicate with one or another of various distant stations at various times, which lie in different directions.

Examples of prior art in array antennas are discussed in the following paragraphs.

Articles

Page H. "Ring-Aerial Systems" Wireless Engineering, October, 1948, pp. 308-315 — describes two arrangements of aerials (elements) arranged in the form of a ring; in one arrangement the amplitudes of the currents in all the elements are the same, but the phase changes progressively around the ring (among other constraints); in the other arrangement the ring currents are in-phase, and a single aerial is added at the center of the ring, carrying a current which may be in phase with or in phase opposition to that of the ring elements.

Knudsen, H. L. "Radiation from Ring Quasi-Arrays'-'IEEE. Antennas & Propagation, July, 1956 (Electromagnetic Wave Theory Symposium) Vol. AP-4, pages 452–472 — concerned with elements placed equidistantly along a circle and carrying currents of the same numerical value but with a phase that increases uniformly along the circle.

Knudsen, H. L. "The Necessary Number of Elements in a Directional Ring Aerial", Journal of Applied Physics, Vol. 22, Number 11, November, 1951, pages 1299–1306 — concerned with the same two arrangements described by Page H (above), as background for discussion of a more complex arrangement comparing ring-arrays of odd and even numbers of elements, the examples illustrated being an eight-element array, and arrays of from five to nine elements, in which relative phases of currents in the elements are periodically adjusted to effect electrical steering of a directivity (beam) pattern.

Cheng, D. K. and Tseng, F. I. "Maximization of Directive Gain for Circular and Elliptic Arrays", Proc. IEE, Vol. 114, pages 589–594, May, 1967 — concerned with a study of the relation between ring diameter (expressed as a function of wave-length) and directivity under various conditions or relative current phases in the antenna elements, which are complex both as to phases and amplitudes in arrays combining isotropic and dipole elements.

Hickman, C. E., NEFF, H. P. and Tillman, J. D. "The Theory of a Single-Ring Circular Array" Transactions AIEE, Vol. 80, Part I, May, 1961, pages 110–115 — describes a six-element array in which the currents and impedances are interrelated in a specific complex configuration, to achieve a steerable directivity pattern with a beam width of about 80°.

Hansen, W. W. and Woodyard, J. R. "A New Principle in Directional Antenna Design" Proc. I.R.E., Vol. 26, No. 3, pages 333-345, March 1938—describes configurations of an end-fire array, and antennas placed in concentric rings, for both vertical directivity and horizontal directivity; the authors note (page 341) that the antennas are not so placed and so phased as to make the effects add as well as possible in the preferred embodiment.

Patents:

Terman, F. E. and Hansen, W. W. — 2,218,487 — Oct. 15, 1940 discusses a pluarlity of arrays of antenna elements, in multiple end-fire arrangements, and in multiple circular arrangements, for both uniform horizontal coverage and directional horizontal coverage. Against this background there has remained a need for a simple and economical-to-realize antenna array having a directional sensitivity pattern which is electrically induced, and which has high gain directional characteristics, which can be electrically steered, and which, in addition, can be made substantially omnidirectional by changing electrical connections to the antenna elements. Some attempts to solve a part of this problem are represented in U.S. Pat. No. 3,996,592 issued Dec. 7, 1976, wherein an array of three vertical dipoles located at the corners of a horizontal equilateral triangle are given directional sensitivity by using two dipoles as parasitic reflectors for the third; the structure used requires that the length of a dipole be electrically altered when changing its function to that of a parasitic reflector. The same general idea appears in the prior art cited in that patent. Included in that art is Yagi Pat. No. 1,860,123 issued May 24, 1932 wherein the length of a dipole is altered from less than a half wave-length in order to switch the directivity of a multielement array; that patent requires a control active radiator and a circular array of parasitic radiators.

DETAILED DESCRITION OF THE DRAWINGS

Figure 1:
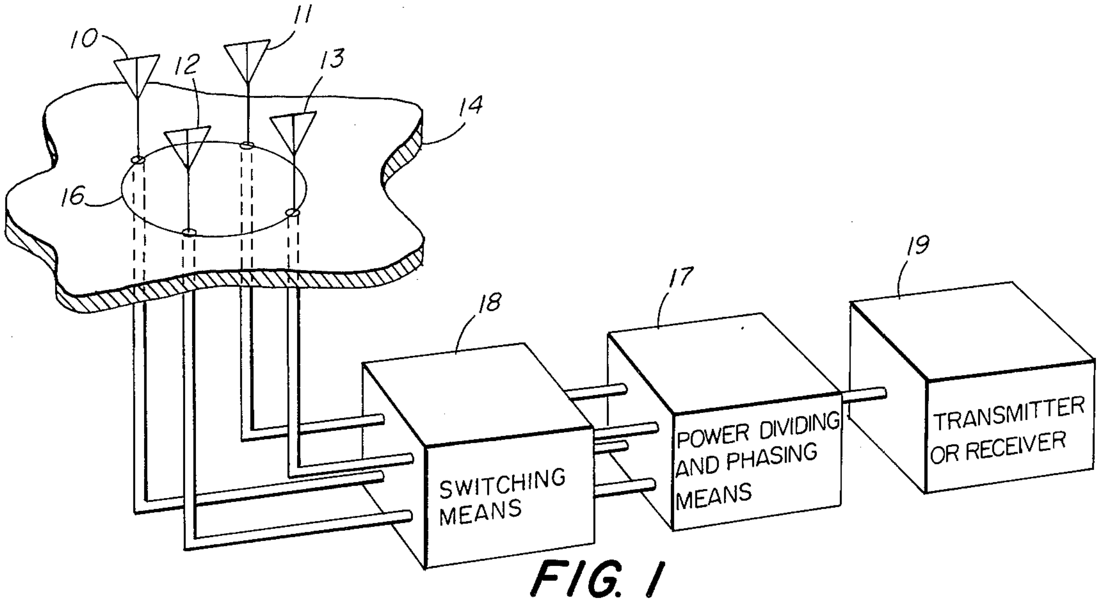
FIG. 1 is a partially perspective view of a 4 antenna element antenna system.
Figure 1A:
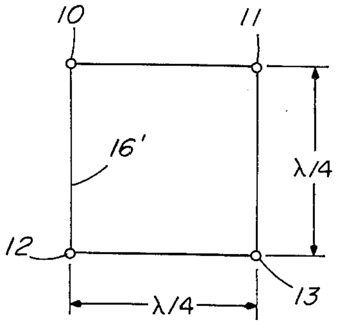
FIG. 1A is a schematic view of a 4 element antenna system.

Referring to FIG. 1, four similar antenna elements 10, 11, 12, 13 are located above a common plane 14 in positions that are equidistant on the circumference of a circle 16 lying in the common plane 14. As shown in FIG. 1A, the antenna elements are also in positions that are at respective corners of a square 16' which is preferably one-fourth wavelength long on each side, referred to the mid-frequency of the operating frequency band. The plane 14 may be located above the ground in any orientation, but in many cases it is the earth surface.

The following description is given, for the sake of simplicity, in terms of a transmitting system, but it will be realized that the system may transmit or receive. Each of the elements is electrically coupled to the power dividing and phasing means 17 through switching means 18, which induce radio frequency currents incident upon the elements to flow in the elements with defined magnitudes and defined electrical phase relationships amongst themselves. Electrically coupled to the power dividing and phasing means are switching means 18 which may allow, if desired, an interchange of the phase and magnitude relationships amongst the antenna elements, as generated by the power dividing and phasing means. A transmitter 19 is electrically coupled to the power dividing and phasing means. The power dividing and phasing means 17 induce radio frequency currents incident upon the antenna elements to flow in the elements with substantially equal magnitudes but with electrical phases which differ such that two of the said elements, which are diametrically opposite each other on circle 16 have equal phase while one of the other elements has an advanced phase of substantially 90° relative to the elements with equal phase, and the remaining element has a retarded phase of substantially 90° relative to the elements with equal phase. When this is achieved, a directional sensitivity pattern, providing a directive beam capable of being electrically steered, will be generated. It is the function of the switching means 8 to select which antenna element is to be activated by each of the signals from the power dividing means 17.

Figure 2:
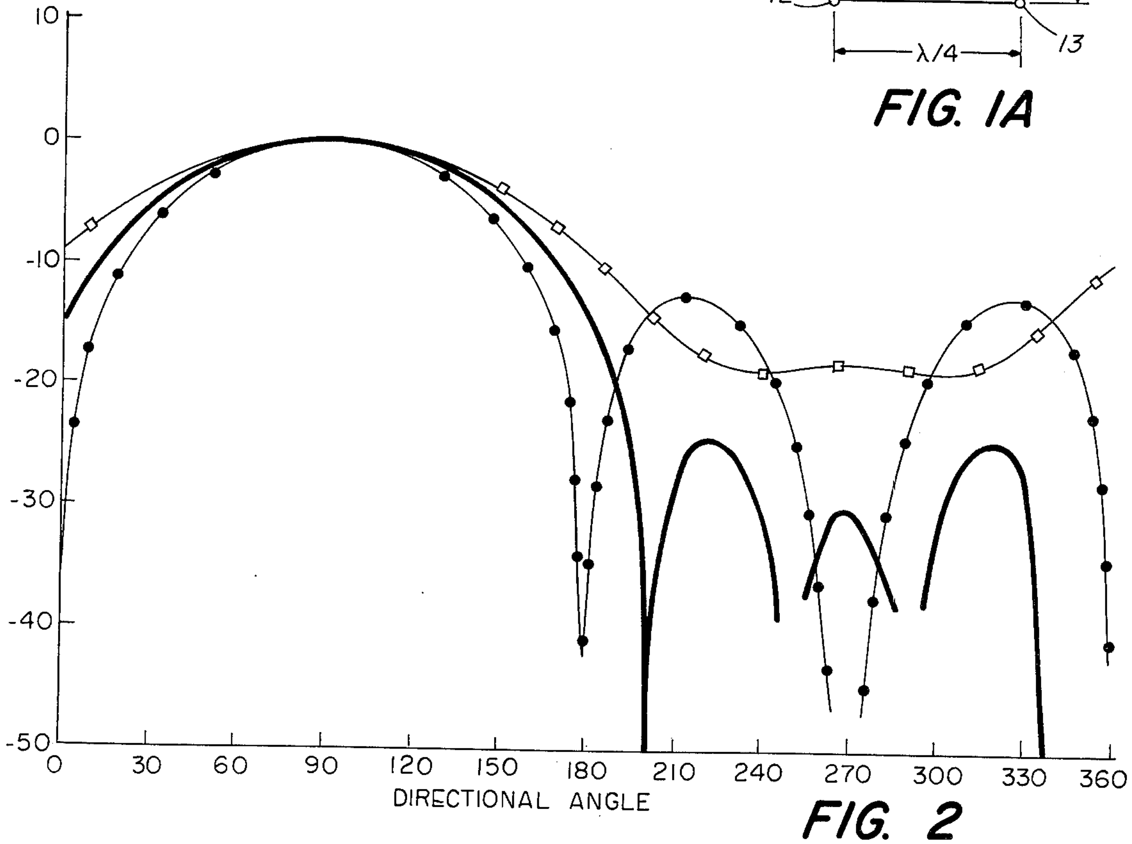
FIG. 2 is a chart depicting relative gain of three antenna systems having antenna elements various distances apart versus direction angle.
Figure 3:
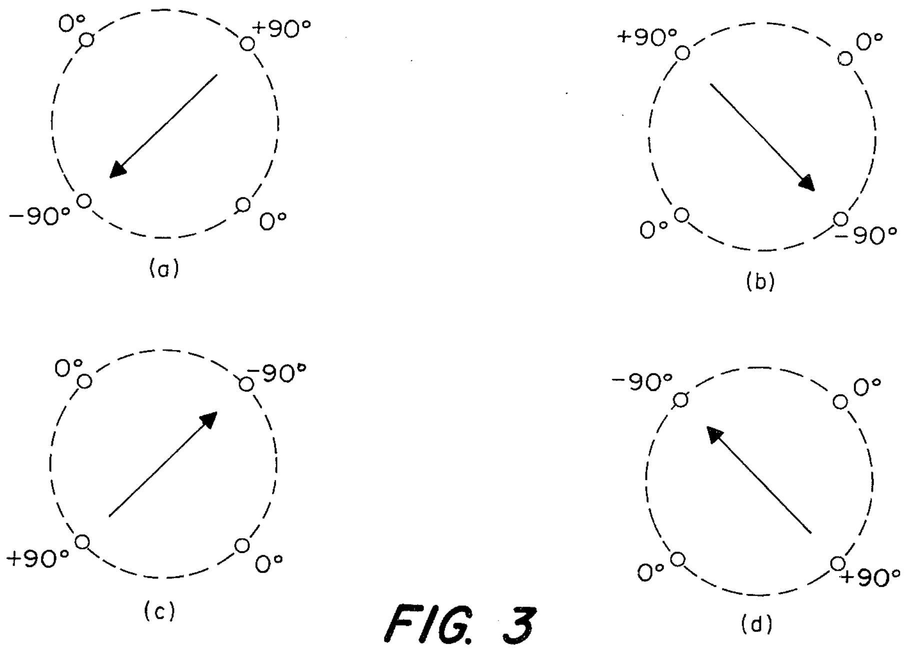
FIG. 3 is a schematic diagram of the phase relation of a 4 antenna element system.

In FIG. 2 are shown computations of the relative antenna gain in decibels as a function of the direction angle. The heavily drawn curve is for the case where the spacing between adjacent antenna elements is one-fourth wavelength. The lightly drawn curves show directional characteristics at other frequencies where the spacing is greater or less than $\lambda/4$. The optimum spacing is substantially $\lambda/4$.

FIGS. **3*a* through 3*d*** show the four sets of phase relations at the four antenna elements appropriate for the four major directions of maximum wave propagation.

There are numerous ways in which a transmitter's signal can be divided equally into four transmission lines at the desired phases −90°, 0°, +90°, 0°, and these signals switched among the four antenna elements. Some of these were described in a published article by two of the present inventors in the magazine QST for April 1976, pp. 27–30. One of these is illustrated in this disclosure as FIG. 4, which next will be explained in detail.

Figure 4:
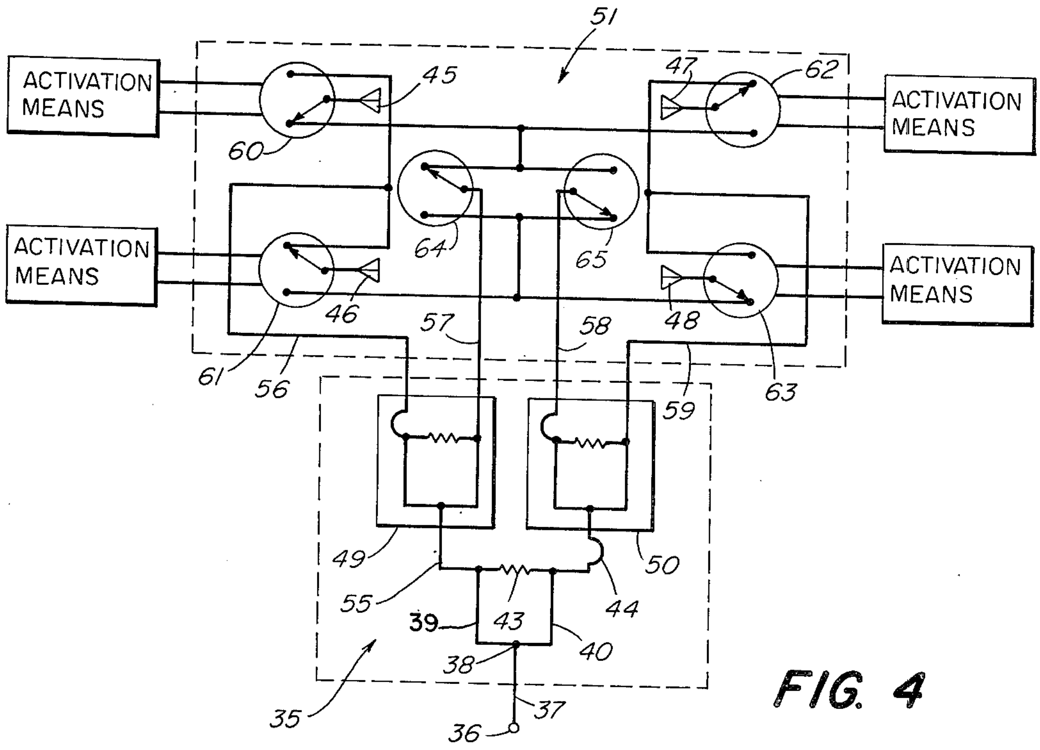
FIG. 4 is a schematic diagram of a power divider and phasing means for a four element antenna system.

Within the dotted box 35 in FIG. 4 are three "Wilkinson" power dividers. Power from the transmitter 36 is transmitted by a transmission line 37 of surge impedance $Z_0$, typically 50 ohms. At the tee 38 the power divides into two parts, transmitted via two lines 39 and 40 each of characteristic impedance $\sqrt{2Z_0}$ (typically about 70 ohms) and of length equal to one-fourth wavelength. A resistor 43 of value $2Z_0$ ohms (typically 100 ohms) is bridged between the two lines at the points shown. Transmission lines 55 and 44, of impedance $Z_0$, continue from these points, one by a short connection, and the other having an excess length of one-fourth wavelength. At the ends of these interconnecting lines 55 and 44, the signal has been divided by two, and that from line 44 has a phase shift of −90° compared with that from line 55. The circuits within the boxes 49 and 50 are identical to the one just described, constituting the second and third Wilkinson power dividers. As before, the powers are divided again into four equal parts in lines 56, 57, 58 and 59. Again there are excess line lengths in two of these lines, each of one-quarter wavelength. These excess lengths drop the phase by −90° in each case. If line 57 is taken as the reference, line 56 has −90° phase shift, line 59 has −90° phase shift, and line 58 has −180° phase shift. Compared with the common phase of lines 56 and 59, line 57 has a +90° phase and line 58 has a −90° phase. These are the four phase states desired at the antennas for optimum directional characteristics. Within the dotted box 51, we show six single-pole double-throw RF switches 60, 61, 62, 63, 64 and 65 each of which can have two alternative states of connection as indicated. These switches are shown in one of four optional combinations. Assuming that the line lengths within the box 51 are all short, the combination shown will activate antennas 46 and 47 with the same phase, while antenna 48 will be activated at −90° with respect to 46 and 47 while antenna 45 will be activated with +90° phase. It is evident that reversing the states of various ones of these switches in various combinations will permit activation of the antennas so that any one can be assigned −90° phase, and another diamatically opposite will have +90° phase, compared with the other two. In this way the directional characteristic of the antenna array can be "steered" in 90° increments around the horizon.

Figure 5:
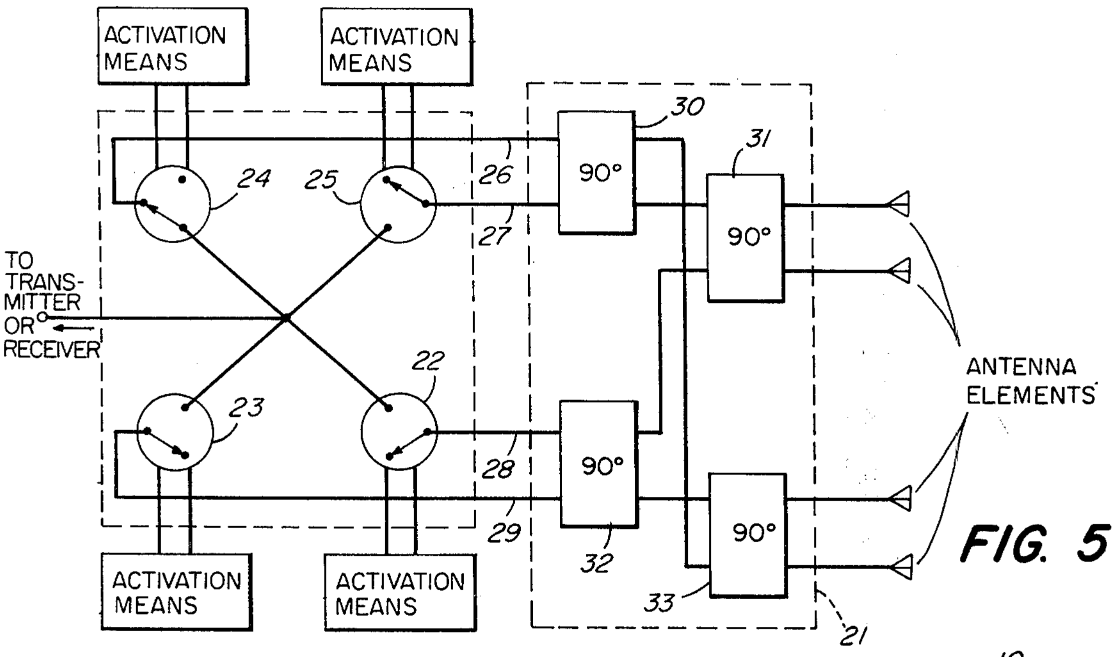
FIG. 5 is a schematic diagram of another embodiment of a power divider and phasing means for a four element antenna system.

In FIG. 5, we show another method of activating four antenna elements from a single transmitter. Within the box 21 we show a combination of four "quadrature hybrid couplers" 30, 31, 32 and 33, which act as power dividers in a manner analogous to a Wilkinson divider which has an excess line length in one arm as shown in boxes 49 and 50 of FIG. 4. If a wave is applied to box 21 through a single one of the lines 26, 27, 28 or 29, the energy will emerge from the activated hybrid, divided in the two lines which emerge from the right side of box 30 (or 32), one with 90° phase advance compared with the other. These lines then feed the hybrid couplers 31 and 33, where the energy is again divided to feed the four antenna elements in relative phases 0°, 0°, −90° and +90° as indicated. Again, single-pole double-throw switches 22, 23, 24 and 25 are used to select which of the elements is to be activated by the −90° phase. Here, one switch is shown connecting the input line from the transmitter to one of the hybrid couplers, the other three being disconnected. Selection of another connection will shift the phase pattern to another direction, allowing the selection of any one of the four directions of propagation.

FIG. 5 allows another option not available in the network of FIG. 4, namely that by connecting all four switches so that all input lines to box 21 are simultaneously activated, we can obtain equal-phase excitation of the four antenna elements. This is a desirable option for many applications, which provides for uniform non-directional propagation as an option. Such behavior is useful when the transmitter is broadcasting to many outlying stations simultaneously or when listening for incoming calls whose direction cannot be anticipated. (If additional switches are added to the diagram of FIG. 4, it is possible to provide this option also. Such switches would by-pass the excess line length shown there attached to the Wilkinson dividers)

Figure 6A:
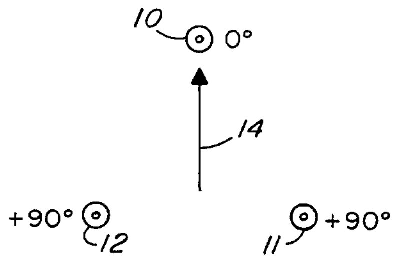
FIG. 6A is a schematic view of the phase relation of a three antenna element system.
Figure 6:
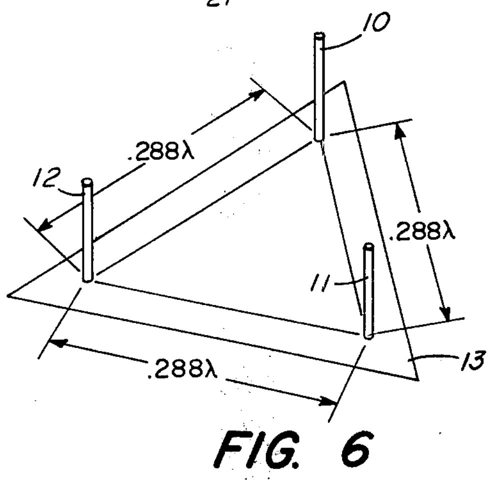
FIG. 6 is a perspective view of a three element antenna system.

FIGS. 6 and 6A illustrate an antenna array analogs to that of FIGS. 1 and 1A. Here, only three elements are used instead of four. In this drawing the power dividing and phasing means and the switching means are not shown, but are quite analogous to those for the four-element array. In this case, six directions of propagation are readily obtainable.

Figure 7:
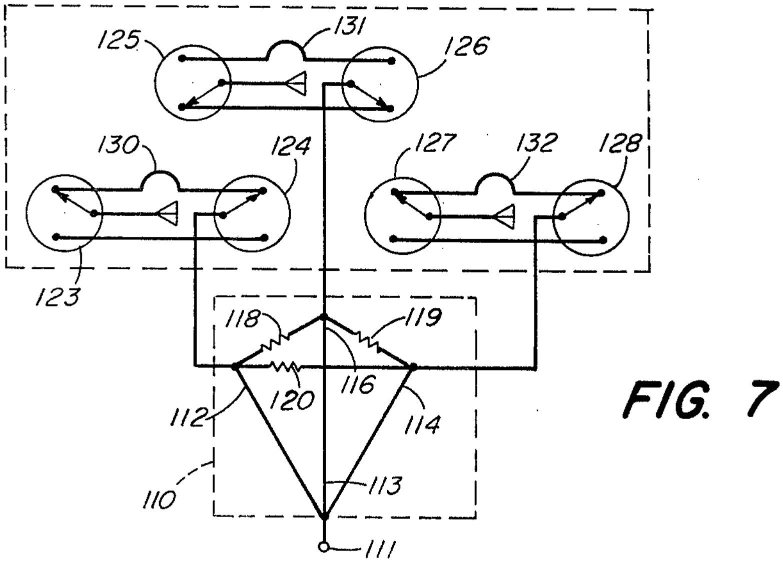
FIG. 7 is a schematic diagram of a power divider and phasing means for a three element antenna system.

FIG. 7 shows one form of circuitry for feeding the three-element array. Within the box 110 is a three-way Wilkinson Power divider. Transmitter power from 111 is transmitted to a 3-way branching point where the three lines 112, 113, and 114 each have a impedance $\sqrt{3}$ times as great as the impedance $Z_0$ of the input line from 111, and each is one-fourth wavelength long. Three resistors 118, 119 and 120, each of value 3 times $Z_0$ interconnect the three lines as shown. This set of branching lines, combined with the resistors constitutes a 3-way Wilkinson Power divider. In these three lines, the power is equally divided and in phase. These lines are transmitted through sets of single-pole-double-throw switches 123, 124, 125, 126, 127 and 128, arranged so that any one of said lines may or may not have an excess line length 130, 131 and 132 of one-fourth wavelength inserted in the path to the respective antenna. By selecting the proper states for these switches, one can provide a set of phase relationships which can be selected to cause the beam to be transmitted in any one of six directions.

For these, two antennas may have equal phase and the third may be advanced or retarded by approximately 90°. There are three ways in which two of the three can be selected to have equal phase, and for each of these ways, two options exist as to whether the remaining antenna has an advanced or a retarded phase. These six options provide six different directions of propagation around the horizon, covering 360°.

We claim:

1. An antenna system for producing from a fixed array of active antenna elements which are each omnidirectional in a plane, a sensitivity pattern that is directional in said plane and which can be rotated around the array, comprising at least three of said elements each located at the corner of a regular polygon, and means for exciting all of the elements with currents of substantially equal magnitudes that are instantaneously in the same phase at two of said corners next adjacent and on either side of a third of said corners, and different in phase by substantially 90 electrical degrees at said third corner, the distance between two adjacent corners of said polygon being in the range substantially one-quarter to substantially 0.288 of the length of a wave at the mid-frequency of the operating frequency band of said system.

2. An antenna system according to claim 1 including a common ground plane, said antenna elements being located substantially equi-distant from said ground plane.

3. An antenna system according to claim 1 having four antenna elements located at respective corners of a square, the current in the element at the fourth corner being in opposite phase to the current in the element at said third corner.

4. An antenna system according to claim 3 wherein each side of said square is substantially one-quarter of the length of a wave at the mid-frequency of the operating frequency band of said system.

5. An antenna system according to claim 3 wherein the corners of said square are located on the circumference of a circle the diameter of which is substantially equal to $\sqrt{2}$ quarter-wavelength of said mid-frequency wave.

6. An antenna system according to claim 1 having three antenna elements located at respective corners of a triangle.

7. An antenna system according to claim 6 wherein each side of said triangle is substantially 0.288 of the length of a wave at the mid-frequency of the operating frequency band.

8. A method of generating a directive antenna beam with high gain over approximately 90° width, with good front-to-back ratios and good front-to-side ratios which comprises:

(a) aligning four vertical antennas in a square configuration above a ground plane with quarter-wave spacing between adjacent antennas; and (b) feeding each of said antennas with equal amplitudes of power but adjusting the phase such that a first antenna is at 0° phase, the two antennas adjacent to said first antenna are each at −90° phase relative to said first antenna, and the fourth antenna is at −180° phase relative to said first antenna.

9. A method of generating a directive antenna beam with high gain over approximately 120° width, with good front-to-back ratios and good front-to-side ratios which comprises:

(a) aligning three vertical antennas in an equilateral triangular configuration above a ground plane with a 0.288 wavelength spacing between adjacent antennas; and (b) feeding each of said antennas with equal amplitudes of power but adjusting the phase such that a first antenna is at 0° phase and the two adjacent antennas are each at −90° phase relative to said first antenna.

10. An antenna system for use in general radio communication in HF, VHF, and UHF bands which comprises:

(a) four vertical antennas in a square configuration above a ground plane with quarter wave spacing between adjacent antennas;

(b) a phasing network with four output ports with said output ports connected to said antennas such that when one or more signals are directed toward the input of the network a 0° phase will be applied to a designated first antenna, a −90° phase relative to the first antenna will be applied to each of the two antennas adjacent to the first antenna, and a −180° phase relative to the first antenna will be applied to the fourth antenna;

(c) a switching network connected to the said phasing network such that upon activation of the switching network the phasing network will cause a different antenna to become the said designated first antenna thereby steering the antenna array's directive beam; and (d) means connected to said switching network for controlling switch activation such that control may be maintained over which antenna will become the said designated first antenna.

11. An antenna system for use in general radio communication in HF, VHF, and UHF bands which comprises:

(a) three vertical antennas in an equilateral triangular configuration above a ground plane with a 0.288 wavelength spacing between adjacent antennas;

(b) a phasing network with three output ports connected to said antennas such that when one or more signals are directed toward the input of the network a 0° phase will be applied to a designated first antenna, and a −90° phase relative to the first antenna will be applied to each of the two antennas adjacent to the first antenna;

(c) a switching network connected to the said phasing network such that upon activation of the switching network the phasing network will cause a different antenna to become the said designated first antenna thereby steering the antenna array's directive beam; and (d) means connected to said switching network for controlling switch activation such that control may be maintained over which antenna will become the said designated first antenna.

12. An array antenna for radiating or receiving radio waves with directional selectivity, comprising four antenna elements with said elements being placed on the circumference of a circle, said elements equally spaced along said circumference, said elements being electrically coupled to a common transmitter (or receiver) through an electrical power-dividing and phasing network said network having the property that energy from said transmitter will induce radio frequency currents to flow in each of said elements with electrical phases which differ such that two of the said elements which are diametrically opposite have equal phase while one of the others has an advanced phase and the remaining one has a retarded phase, both compared with the phase of the equally-driven pair, the diameter of said circle being substantially equal to 2 quarter-wavelength of a wave at the mid-frequency of the operating frequency band of said array.

13. An array antenna according to claim 12 in which said electrical power dividing and phasing network further includes electrical switching means for effecting an interchange of the phase relationships such that any one of the four elements may be selected as the one which has an advanced phase.

14. An antenna system according to claim 13 in which said electrical power dividing and phasing network includes power dividing means consisting of three Wilkinson type two-way power dividers in tandem arrangement, and phasing means consisting of transmission lines of different lengths, such that one of the two lines from each of said Wilkinson dividers is longer than the other.

15. An antenna system according to claim 13 in which said switching means is constituted of a tandem arrangement of multiple throw RF switches which permit the selection of any one antenna element to have a retarded phase while simultaneously two diametrically opposite antennas have the same phase and the fourth has an advanced phase.

16. An antenna system according to claim 13 in which said network includes power dividing means for providing equal power in each of four transmission lines, and phasing means consists of said four transmission lines of various lengths between said power dividing means and respective ones of said four antenna elements.

17. An array antenna according to claim 13 in which said electrical power dividing and phasing network includes further switching means which allows, as an additional option, that all four elements may be electrically driven with equal phases and equal magnitudes to provide substantially nondirectional radiation.

18. An antenna system according to claim 17 in which said electrical power dividing and phasing network consists of an interconnected network of four three-db hybrid directional couplers, said couplers each having four transmission line ports of which two are input ports and two are output ports so designed that an input wave at either input port is equally divided at the output ports with 90° phase difference, and said switching means consisting of one or more multiple-throw RF switches to select which of said input ports is to be connected to the transmitter or receiver.

19. An array antenna for radiating or receiving radio waves with directional selectivity, comprising three antenna elements erected above a ground plane with said elements being placed on the circumference of a circle on said ground plane, equally spaced on said circumference, said elements being coupled to a common transmitter (or receiver) through an electrical power dividing and phasing network which will induce radio frequency currents to flow in two of said elements with equal phase and in the third element with either and advanced or retarded phase compared with the other two, the distance between any two of said elements being substantially 0.288 of the length of a wave at the mid-frequency of the operating frequency band of the array.

20. An array antenna system according to claim 19 in which switching means are included to allow selection of any two elements to have the same phase, with the third having a different phase.

21. An array antenna system according to claim 20 in which the said switching means permits the uniquely phased element to be given either an advanced or a retarded phase compared with the other two.

22. An array antenna system according to claim 21 in which said switching means permits excitation of all three elements with the same phase to provide the option of non-directional radiation.

* * * * *